March 10, 1942.   A. J. DAVIDSON, JR   2,276,026
POCKETKNIFE
Filed July 1, 1940

INVENTOR.
ANDREW J. DAVIDSON, JR.
BY
ATTORNEYS

Patented Mar. 10, 1942

2,276,026

UNITED STATES PATENT OFFICE 2,276,026

POCKETKNIFE

Andrew J. Davidson, Jr., Detroit, Mich., assignor of one-half to Emil A. Dwiggins, Detroit, Mich.

Application July 1, 1940, Serial No. 343,484

13 Claims. (Cl. 30—153)

This invention relates generally to implements and refers more particularly to pocket knives.

One of the essential objects of the invention is to provide a knife of this type wherein the blade or cutting element is normally encased or enclosed to prevent accidental injury therefrom, but is adapted to spring automatically into an operative cutting position when moved manually from closed position to a predetermined open position relative to the casing. No push button, separate latch or the like is employed or required.

Another object is to provide a knife wherein the carrier for the blade cooperates with the casing when the blade is in open position to serve as a handle for the knife and cooperates with the casing when the blade is in closed position to serve as a case for the blade.

Another object is to provide a knife wherein the blade is effectively held in its operative cutting position against movement relative to the casing.

Another object is to provide a knife that is simple in construction and economical to manufacture.

Other objects, advantages and novel details of construction of this invention will be made more apparent as this description proceeds, especially when considered in connection with the accompanying drawing, wherein.

Figure 1:
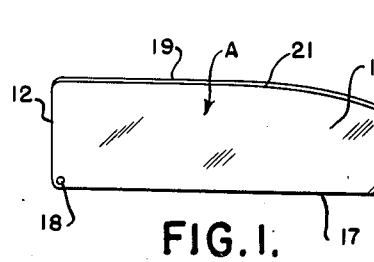
Figure 1 is a plan view of a knife embodying my invention and showing it in fully closed inoperative position.
Figure 2:
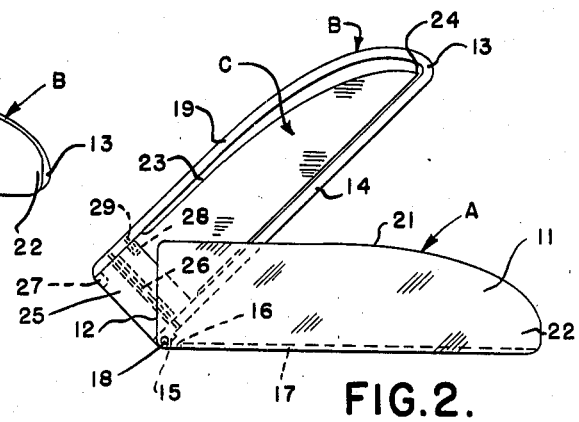
Figure 2 is a view similar to Figure 1 showing the blade carrier and blade therein at approximately a 45° angle to the casing.

Referring now to the drawing, A is the casing, B is the blade carrier or holder, and C is the blade or cutting element of a knife embodying my invention.

As shown, the casing A is a channel-shaped member and is preferably formed of sheet metal. Preferably opposite side edges of the channel are curved longitudinally from points substantially midway their ends to one end of the casing so that opposite sides 10 and 11, respectively, of the casing will substantially conform in configuration to the shape of the blade C. In the present instance, the casing A serves as the handle of the knife and as a sheath for both the carrier B and blade C.

The carrier B is in the form of an elongated frame for the blade and normally nests between and substantially conforms in shape to opposite sides 10 and 11 of the casing. Preferably the carrier B is formed of a strip or bar of metal that is substantially equal in depth to the distance between opposite sides 10 and 11 of the casing. One end of the carrier is open to receive the blade C and is normally flush with the broad end 12 of the casing, while the other end 13 of the carrier is preferably rounded and projects slightly beyond the narrow end of the casing so as to constitute a finger piece. In the present instance, the open end of the carrier is pivotally connected to the broad end 12 of the casing so as to swing into and out of the casing. For this purpose the inner side 14 of the carrier is provided at the open end thereof with an enlargement 15 that is received in a slot 16 in the base 17 of the casing at the broad end 12 of the latter and that is connected to said casing by a pivot pin 18 that extends through opposite sides of the casing adjacent said slot.

When in normal closed inoperative position, the inner side 14 of the carrier is adjacent and substantially parallel to the base 17 of the casing, while the outer side 19 of the carrier is substantially flush with the longitudinal edges 20 and 21 of the casing. The rounded end 13 of the carrier is readily accessible as a finger piece at the narrow end 22 of the casing. Thus, the carrier B cooperates with the casing A to enclose the blade C and prevent injury from the cutting edge 23 or point 24 thereof.

The blade C is of conventional design and has a short substantially rectangular shank 25 extending between and connected by a pivot pin 26 to opposite sides 14 and 19, respectively, of the carrier at its open end. Preferably the pivot pin 26 is rigid with the carrier adjacent the open end thereof, while the shank 25 of the blade is free to turn 180° on said pin from a closed position within the carrier to an open position extending endwise of said carrier. Preferably the shank 25 of the blade is provided at substantially diametrically opposite sides of the pivot pin 26 with recesses 27 and 28 that are adapted to alternately receive a stop pin 29 rigid with and projecting inwardly from the outer side 19 of the carrier. The bases 30 and 31, respectively, of these recesses are at such depth in the shank 25 of the blade that they will abut the stop pin 29 when the blade C is either in fully closed position within the carrier or in fully open position extending endwise of the carrier.

For automatically moving the blade C from closed to open position when the carrier B is moved by hand 90° or more about the pivot pin 18 from its nested position to an open position relative to the casing A, there is a coil spring 32 sleeved on the pivot pin 26 inside the shank 25 and terminally secured to the shank and pin.

Figure 3:
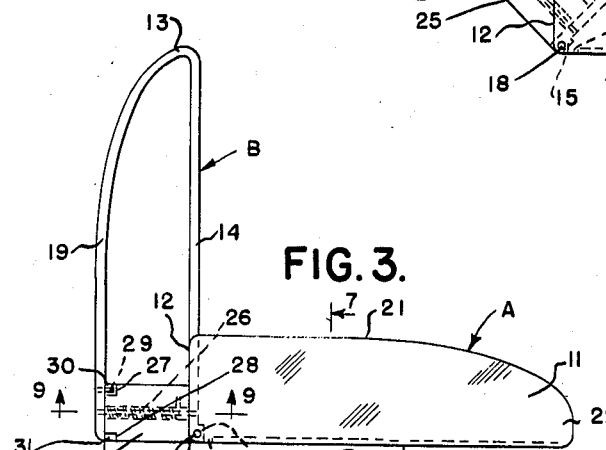
Figure 3 is a view similar to Figure 2 but showing the extended position assumed automatically by the blade when the carrier reaches a 90° or more angle relative to the casing.
Figure 7:
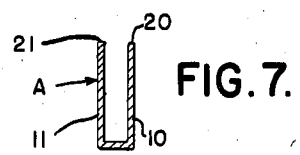
Figure 7 is a sectional view taken on the line 7—7 of Figure 3.
Figure 4:
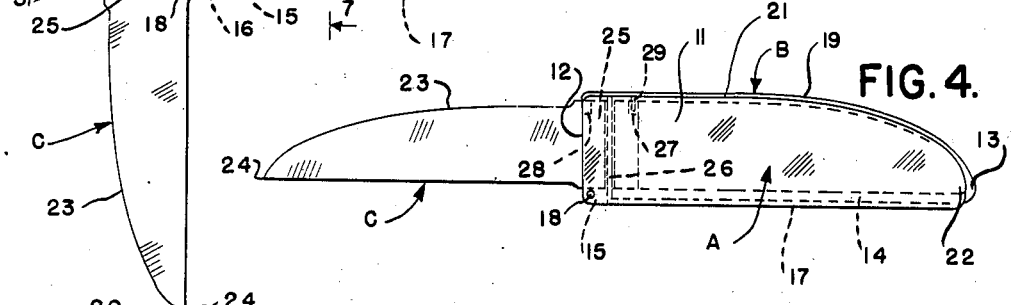
Figure 4 is a view similar to Figure 3 but showing the blade in extended position ready for use after the carrier has been returned to its nested position in the casing.
Figure 5:
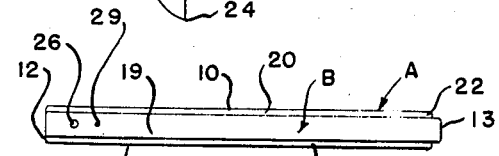
Figure 5 is an edge elevation of the knife illustrated in Figure 1.
Figure 9:
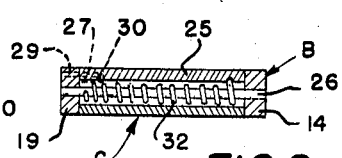
Figure 9 is a sectional view taken on the line 9—9 of Figure 3.
Figures 6, 8:
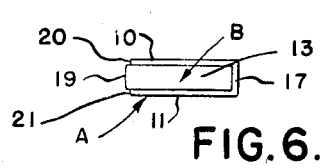
Figure 6 is an end view of the knife illustrated in Figure 1.
Figure 8 is an end view illustrating the end of the knife opposite from that shown in Figure 6.

In use, the parts are normally in closed position as illustrated in Figure 1. However, the finger piece 13 may be engaged by hand when it is desired to swing the carrier B and blade C from closed position to open position. When the carrier B reaches an open position substantially at right angles or more to the casing A, the blade C will be clear of the casing A, hence will be moved automatically by the spring 32 from its closed position within the carrier to its open position extending endwise of the carrier, as illustrated in Figure 3. The carrier B may then be returned about its pivot 18 to its nested position in the casing A as illustrated in Figure 4, so that the knife will be ready for use. In this position the outer side 19 of the carrier cooperates with the casing A to form a handle to be grasped in the hand of the operator. In so doing, the carrier B is maintained by the hand of the operator in nested position and therefore will not accidentally come open. Moreover, the shank 25 of the blade is then between and firmly braced and held against movement by the inner and outer sides 14 and 19 of the carrier and opposite sides 10 and 11 of the casing, hence no accidental folding or collapse of the blade is possible.

To return the blade C to closed inoperative position, the carrier B is first moved by hand from its nested position (Figure 4) to a position at least at right angles to the casing A (Figure 3). The blade C is then moved by hand against the tension of spring 32 from its extended position (Figure 3) to its closed position within the frame. The blade C is then held by hand in this closed position in the carrier, while the latter with the blade therein is returned to fully closed position, as illustrated in Figure 4.

Although I have shown and described herein a knife construction, it is to be understood that any other suitable implement or element may be substituted for the blade C. For example, a conventional finger nail file or screw driver blade or the like having a shank like 25 could be readily substituted if desired. Thus, the invention is not to be limited to a knife construction.

What I claim as my invention is:

1. A knife having a blade, a carrier for the blade, and a casing for the blade and carrier, the casing being a channel-shaped member, the carrier being an elongated U-shaped guard for the blade, the end of one arm of the U at the open end of the carrier being pivoted between the sides of the channel of the casing at one end thereof so that the guard may swing laterally into and out of the channel of the casing, the width of the guard being slightly greater than the width of the channel casing so that the other arm of the U is disposed at the longitudinal edges of the channel to close the latter when the guard is within the channel of the casing, the base or closed end of the U-shaped guard projecting slightly beyond the other end of the channel casing when the guard is within the channel of the casing so as to be available as a fingerpiece for moving the guard out of the casing, and one end of the blade being pivoted between the arms of the U in the pivoted open end of the latter so as to swing endwise of the guard from a position wholly within the same to a position projecting endwise therefrom when the guard is swung clear of the casing.

2. A knife having a blade, a carrier for the blade, and a casing for the blade and carrier, the casing being a channel-shaped member, the carrier being an elongated U-shaped guard for the blade, the end of one arm of the U at the open end of the carrier being pivoted between the sides of the channel of the casing at one end thereof so that the guard may swing laterally into and out of the channel of the casing, the base or closed end of the U-shaped guard projecting slightly beyond the other end of the channel casing when the guard is within the channel of the casing so as to be available as a fingerpiece for moving the guard out of the casing, and one end of the blade being pivoted between the arms of the U at the pivoted open end of the latter so as to swing endwise of the guard from a position wholly within the same to a position projecting endwise therefrom when the guard is swung clear of the casing.

3. A knife having a blade, a carrier for the blade, and a casing for the blade and carrier, the casing being a channel-shaped member, the carrier being an elongated U-shaped guard for the blade, the end of one arm of the U at the open end of the carrier being pivoted between the sides of the channel of the casing at one end thereof so that the guard may swing laterally into and out of the channel of the casing, and one end of the blade being pivoted between the arms of the U at the pivoted open end of the latter so as to swing endwise of the guard from a position wholly within the same to a position projecting endwise therefrom when the guard is swung clear of the casing.

4. A knife having a blade, a carrier for the blade, and a casing for the blade and carrier, the casing being a channel-shaped member, the carrier being an elongated U-shaped guard for the blade, the end of one arm of the U at the open end of the carrier being pivoted between the sides of the channel of the casing at one end thereof so that the guard may swing laterally into and out of the channel of the casing, and one end of the blade being pivoted between the arms of the U at the pivoted open end of the latter so as to swing endwise of the guard from a position wholly within the same to a position projecting endwise therefrom when the guard is swung clear of the casing, and means for automatically swinging the blade endwise of the guard as aforesaid when the latter is swung clear of the casing.

5. A knife having a blade, a carrier for the blade, and a casing for the blade and carrier, the casing being a channel-shaped member, the carrier being an elongated U-shaped guard for the blade, the end of one arm of the U at the open end of the carrier being pivoted between the sides of the channel of the casing at one end thereof so that the guard may swing laterally into and out of the channel of the casing, and one end of the blade being pivoted between the arms of the U at the pivoted open end of the latter so as to swing endwise of the guard from a position wholly within the same to a position projecting endwise therefrom when the guard is swung clear of the casing, means operable automatically when the guard is swung clear of the casing for swinging the blade endwise of the guard as aforesaid, and means carried by the guard for limiting the swinging movement of the blade relative thereto.

6. A knife having a blade, a carrier for the blade, and a casing for the blade and carrier, the casing being a channel-shaped member, a pivot pin extending between the sides of the channel of the casing at one end thereof, the carrier being an elongated U-shaped guard for the blade, the end of one arm of the U at the open end of the carrier being pivoted on the pin between the sides of the channel casing so that the carrier may swing into and out of the channel of the casing, the base or closed end of the U-shaped carrier projecting slightly beyond the other end of the channel casing when the carrier is within the channel of the casing so as to be available as a fingerpiece for moving the carrier out of the casing, a pivot pin for the blade extending transversely of the same at one end thereof and engaging the arms of the U-shaped carrier at the open end thereof, and means for automatically swinging the blade about its pivot pin from a position wholly within the carrier to a position projecting endwise therefrom when the carrier is swung clear of the casing.

7. A knife having a blade, a carrier for the blade, and a casing for the blade and carrier, the casing being a channel-shaped member, a pivot pin extending between the sides of the channel of the casing at one end thereof, the carrier being an elongated U-shaped guard for the blade, the end of one arm of the U at the open end of the carrier being pivoted on the pin between the sides of the channel casing so that the carrier may swing into and out of the channel of the casing, the base or closed end of the U-shaped carrier projecting slightly beyond the other end of the channel casing when the carrier is within the channel of the casing so as to be available as a fingerpiece for moving the carrier out of the casing, a pivot pin for the blade extending transversely of the same at one end thereof and engaging the arms of the U-shaped carrier at the open end thereof, and means including a coil spring sleeved on the pivot pin for the blade and terminally engaging the blade and pin for automatically swinging the blade about its pivot pin from a position wholly within the carrier to a position projecting endwise therefrom when the carrier is swung clear of the casing.

8. A knife having a blade, a carrier for the blade, and a casing for the blade and carrier, the casing being a channel-shaped member, a pivot pin extending between the sides of the channel of the casing at one end thereof, the carrier being an elongated U-shaped guard for the blade, the end of one arm of the U at the open end of the carrier being pivoted on the pin between the sides of the channel casing so that the carrier may swing into and out of the channel of the casing, the base or closed end of the U-shaped carrier projecting slightly beyond the other end of the channel casing when the carrier is within the channel of the casing so as to be available as a fingerpiece for moving the carrier out of the casing, a pivot pin for the blade extending transversely of the same at one end thereof and engaging the arms of the U-shaped carrier at the open end thereof, means for automatically swinging the blade about its pivot pin from a position wholly within the carrier to a position projecting endwise therefrom when the carrier is swung clear of the casing, and means including a stop carried by the carrier for limiting the swinging movement of the blade relative thereto.

9. A knife having a blade, a carrier for the blade, and a casing for the blade and carrier, the casing being a channel-shaped member, a pivot pin extending between the sides of the channel of the casing at one end thereof, the carrier being an elongated U-shaped guard for the blade, the end of one arm of the U at the open end of the carrier being pivoted on the pin between the sides of the channel casing so that the carrier may swing into and out of the channel of the casing, a pivot pin for the blade at one end thereof engaging the arms of the U-shaped carrier at its open end, spring means for automatically swinging the blade from a position wholly within the carrier to a position projecting endwise therefrom when the carrier is swung clear of the casing, and means including a stop carried by the carrier for limiting the swinging movement of the blade relative to the carrier.

10. A knife having a blade, a carrier for the blade, and a casing for the blade and carrier, the casing being a channel-shaped member, a pivot pin for the carrier extending between the sides of the channel-shaped casing at one end thereof, the carrier being an elongated substantially U-shaped guard for the blade, the end of one arm of the U at the open end of the carrier being pivoted on said pin so that the carrier may swing about said pin into and out of the channel-shaped casing, a pivot pin for the blade extending between the arms of the U-shaped carrier at the open end thereof, and the blade being between the arms of the U-shaped carrier and pivoted at one end upon the last mentioned pin so that the blade may swing about its pivot pin into and out of the U-shaped carrier when the latter has been swung out of the casing.

11. A knife having a blade, a carrier for the blade, and a casing for the blade and carrier, the casing being a channel-shaped member, a pivot pin for the carrier extending between the sides of the channel-shaped casing at one end thereof, the carrier being an elongated substantially U-shaped guard for the blade, the end of one arm of the U at the open end of the carrier being pivoted on said pin so that the carrier may swing about said pin into and out of the channel-shaped casing, a pivot pin for the blade extending between the arms of the U-shaped carrier at the open end thereof, the blade being pivoted at one end upon the last mentioned pin so that the blade may swing about its pivot pin into and out of the U-shaped carrier when the latter has been swung out of the casing, and spring means operable when the carrier is swung out of the casing to swing the blade out of the carrier.

12. A knife having a blade, a carrier for the blade, and a casing for the blade and carrier, the casing being a channel-shaped member, the carrier being an elongated substantially U-shaped guard for the blade, the end of one arm of the U at the open end of the carrier being pivoted to the casing so that the carrier may swing into and out of the channel-shaped casing, the blade being between the arms of the U-shaped carrier and pivoted at one end to the carrier at the open end thereof so that the blade may swing into and out of the carrier when the latter is swung out of the casing, the sides of the channel-shaped casing being operable when the carrier is in the casing to hold the blade either in or out of the carrier.

13. A knife having a blade, a carrier for the blade, and a casing for the blade and carrier, the casing being a channel-shaped member, the carrier being an elongated substantially U-shaped guard for the blade, the end of one arm of the U at the open end of the carrier being pivoted to the casing so that the carrier may swing into and out of the channel-shaped casing, the blade being between the arms of the U-shaped carrier and pivoted at one end to the carrier at the open end thereof so that the blade may swing into and out of the carrier when the latter is swung out of the casing, and means operable automatically when the carrier is swung out of the casing to swing the blade out of the carrier, the sides of the channel-shaped casing being operable when the carrier is in the casing to hold the blade either in or out of the carrier.

ANDREW J. DAVIDSON, Jr.